(12) United States Patent
Whitfield et al.

(10) Patent No.: US 9,703,595 B2
(45) Date of Patent: Jul. 11, 2017

(54) MULTI-CORE SYSTEM WITH CENTRAL TRANSACTION CONTROL

(75) Inventors: Michael Whitfield, Valbonne (FR); Alexey Pynko, Irvine, CA (US); Jason B. Brent, Foothill Ranch, CA (US); Majid Shaghaghi, Irvine, CA (US); Michael S. Beadle, Tustin, CA (US)

(73) Assignee: Mindspeed Technologies, LLC, Newport Beach, CA (US)

( * ) Notice: Subject to any disclaimer, the term of this patent is extended or adjusted under 35 U.S.C. 154(b) by 1278 days.

(21) Appl. No.: 12/313,561

(22) Filed: Nov. 20, 2008

(65) Prior Publication Data

US 2010/0088703 A1 Apr. 8, 2010

Related U.S. Application Data

(60) Provisional application No. 61/195,076, filed on Oct. 2, 2008.

(51) Int. Cl.
*G06F 9/48* (2006.01)
*G06F 9/50* (2006.01)

(52) U.S. Cl.
CPC .......... *G06F 9/4843* (2013.01); *G06F 9/5027* (2013.01)

(58) Field of Classification Search
CPC .................................................. G06F 9/4843
See application file for complete search history.

(56) References Cited

U.S. PATENT DOCUMENTS

| | | | |
|---|---|---|---|
| 6,021,275 A * | 2/2000 | Horwat | 717/159 |
| 6,434,590 B1 | 8/2002 | Blelloch | |
| 7,600,221 B1 * | 10/2009 | Rangachari | 717/128 |
| 7,647,475 B2 * | 1/2010 | Svendsen | G06F 9/3017 712/218 |
| 8,205,205 B2 | 6/2012 | Franke | |
| 2002/0087618 A1 * | 7/2002 | Bohm et al. | 709/201 |

(Continued)

OTHER PUBLICATIONS

Kam-Mun-Chong, Hai-Shuan-Lam, Eswaran-Chikkannan, Phon-Amnuaisuk-Somnuk. "Enhanced parallel thread scheduling for Java based applications on multi-core architecture" 2008 10th International Conference on Advanced Communication Technology, Gangwon-Do, South Korea, Feb. 17-20, 2008.*

(Continued)

*Primary Examiner* — Jacob A Petranek
(74) *Attorney, Agent, or Firm* — Farjami & Farjami LLP (57) ABSTRACT

There is provided a multi-core system that includes a lower-subsystem including a first processor and a number of slave processing cores. Each of the slave processing cores can be a coprocessor or a digital signal processor. The first processor is configured to control processing on the slave processing cores and includes a system dispatcher configured to control transactions for execution on the slave processing cores. The system dispatcher is configured to generate the transactions to be executed on the slave processing cores. The first processor can include a number of hardware drivers for receiving the transactions from the system dispatcher and providing the transactions to the slave processing cores for execution. The multi-core system can further include an upper sub-system in communication with the lower-subsystem and including a second processor configured to provide protocol processing.

16 Claims, 4 Drawing Sheets

(56) References Cited

U.S. PATENT DOCUMENTS

| | | | |
|---|---|---|---|
| 2003/0018680 A1* | 1/2003 | Iglesias | G06F 9/30 718/100 |
| 2003/0149716 A1 | 8/2003 | Peterson | |
| 2004/0054998 A1 | 3/2004 | Hayashi | |
| 2004/0139286 A1 | 7/2004 | Lin | |
| 2005/0246340 A1 | 11/2005 | Smith | |
| 2007/0033592 A1 | 2/2007 | Roediger | |
| 2007/0113231 A1 | 5/2007 | Honmura | |
| 2007/0220517 A1* | 9/2007 | Lippett | 718/102 |
| 2007/0226699 A1* | 9/2007 | Kato | G06F 11/3636 717/128 |
| 2008/0040725 A1* | 2/2008 | Moss | 718/106 |
| 2008/0195843 A1* | 8/2008 | Muniandy | 712/31 |
| 2008/0235698 A1 | 9/2008 | Bansal | |
| 2008/0288946 A1 | 11/2008 | Richards | |
| 2009/0106767 A1 | 4/2009 | Buckler | |
| 2009/0133032 A1* | 5/2009 | Biles et al. | 718/106 |
| 2009/0150888 A1 | 6/2009 | Ye | |
| 2009/0172306 A1* | 7/2009 | Nussbaum et al. | 711/154 |
| 2009/0307464 A1* | 12/2009 | Steinberg et al. | 712/31 |

OTHER PUBLICATIONS

Ahmad, et al.: " DPS: dynamic priority scheduling heuristic for heterogeneous computing systems" IEE Proceedings: Computer and Digital Techniques, IEE, GB, vol. 145, No. 6, Nov. 19, 1998, pp. 411-418.

Sibai, Fadi N.: "Nearest Neighbor Affinity Scheduling in Heterogeneous Multi-Core Architectures" Journal of Computer Science and Technology, vol. 8, No. 3, Oct. 2008, pp. 144-150.

Augonnet, et al: "StarPU: A Unified Platform for Task Scheduling on Heterogeneous Multicore Architectures", Euro-Par 2009 Parallel Processing, Springer Berlin Heidelberg, Berlin, Heidelberg, vol. 5704, Aug. 25, 2009, pp. 863-874.

Shelepov, et al: "HASS: a scheduler for heterogeneous multicore systems" Operating Systems Review ACM USA, vol. 43, No. 2, Apr. 2009 pp. 66-75.

* cited by examiner

MULTI-CORE SYSTEM WITH CENTRAL TRANSACTION CONTROL

RELATED APPLICATIONS

This application claims priority from U.S. Provisional Application No. 61/195,076, filed Oct. 2, 2008, which is hereby incorporated by reference in its entirety.

BACKGROUND OF THE INVENTION

1. Field of the Invention

The present invention relates generally to processing systems and, more specifically to processing systems with multi-core processing systems.

2. Background Art

In the past, increasing performance in processing-intensive electronic devices, such as base transceiver stations and other types of communications devices, could be achieved merely by increasing the processor clock speed of the devices. Since this approach is no longer practical, the use of multi-core systems has become a popular approach for increasing performance in processing-intensive electronic devices, such as base station transceivers. To realize the potential increase in performance that multiple processing cores can provide, however, each processing core needs to be programmed so that the processing workload is appropriately divided over all of the processing cores. However, programming multiple processing cores can be significantly more complicated than programming a single core.

Conventional multi-core systems can include, for example, one or more Reduced Instruction Set Computing (RISC) processors and a number of slave processing cores, such as digital signal processors (DSPs) and/or co-processors. A typical conventional approach for programming a multi-core system includes handling each processing core as an intelligent entity that communicates with others via a framework or multi-processor operating system. However, in this conventional approach the communication between the different processing cores must be explicitly handled. As a result, a programmer must be concerned with the number of slave processing cores in the multi-core system and the operation of each processing core, which places an undesirable burden on the programmer. Accordingly, there is a need in the art for a multi-core system that can effectively address the aforementioned difficulty of programming multiple slave processing cores in a conventional multi-core system.

SUMMARY OF THE INVENTION

There is provided a multi-core system with central transaction control, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

The present invention provides a multi-core system having centralized control of transactions that are executed by hardware resources, such as slave processing cores. In one embodiment, the multi-core system includes an upper sub-system and a lower sub-system, which are coupled together by a data path for providing inter sub-system communication. The upper sub-system can include an upper processor and the lower sub-system can include a lower processor, hardware resources, such as slave processing cores, and Input/Output (I/O) interfaces, such as Ethernet and radio interfaces. For example, the upper sub-system can primarily handle Medium Access Control (MAC) layer functions, such as high level control protocols, Internet Protocol (IP) packet flow, and encryption, while the lower sub-system can primarily handle Physical (PHY) layer functions, such as hard real-time processing. In one embodiment, all of the slave processing cores in the multi-core system can be implemented in a single semiconductor device. In one embodiment, the slave processing cores in the multi-core system can be implemented across multiple semiconductor devices.

The upper processor in the upper sub-system can be, for example, a RISC processor, such as an Advanced RISC Machines (ARM) processor and can provide protocol processing, such as Internet Protocol (IP) processing. In one embodiment, the upper processor can include an embedded operating system, such as an embedded Linux operating system, for providing full IP processing functionality and allowing easy porting of third party software, while avoiding features that are unnecessary for an embedded application. The upper processor can include, for example, an extremely thin operating system abstraction layer to allow the operating system utilized on the upper processor to be easily changed, thereby advantageously improving operating system portability. In one embodiment, the operating system abstraction layer can comprise a set of #define statements so as to decouple the specific operating system function names from those used by application code.

The lower processor, which can also be a RISC processor, such as an ARM processor, can be primarily utilized to perform control functions, such as real-time transaction control, while hardware resources such as slave processing cores can perform real-time transaction processing. The lower processor in the lower sub-system includes a system dispatcher, which can comprise a customized program for providing centralized control of transactions for execution on hardware resources including slave processing cores, such as DSPs and/or coprocessors. For example, the system dispatcher can advantageously enable the operation of the slave processing cores to be transparent to a programmer. In one embodiment, the lower processor can include a hard real-time operating system, such as a ThreadX operating system, which can be optimized to support only required features. One embodiment of the multi-core system, according to the present invention, is discussed below in relation to FIG. 1.

Figure 1:
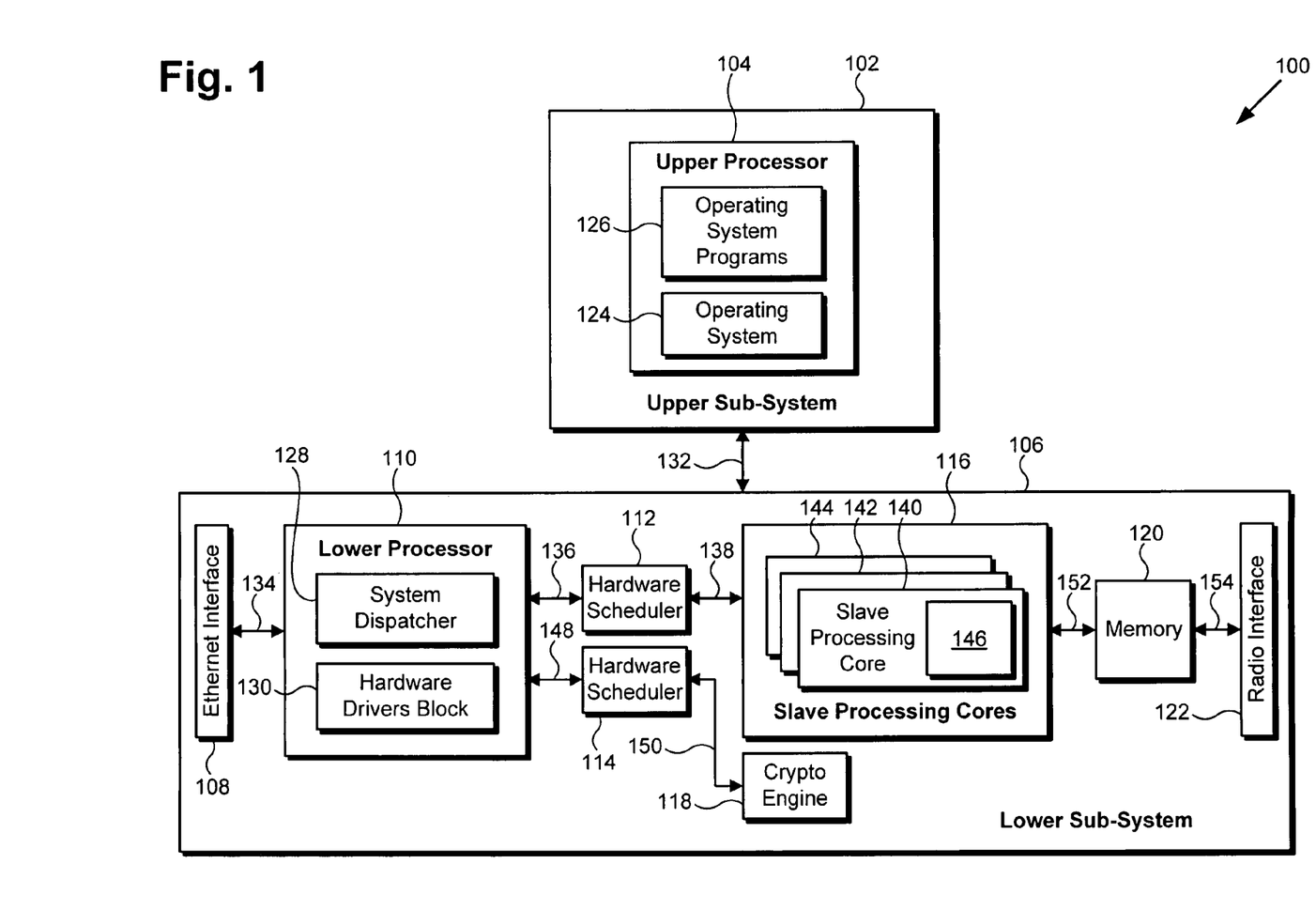
FIG. 1 shows a diagram of an exemplary multi-core system, according to one embodiment of the present invention.

FIG. 1 shows a diagram of multi-core system 100, according to one embodiment of the present invention. As shown, multi-core system 100 includes upper sub-system 102, which includes upper processor, and lower sub-system 106, which includes Ethernet interface 108, lower processor 110, hardware schedulers 112 and 114, slave processing devices 116, crypto engine 118, memory 120, and radio interface 122. Lower sub-system 106 can also include one or more direct memory access (DMA) engines (not shown in FIG. 1) for transferring blocks of data from one device, such as a digital signal processor (DSP) in slave processing cores 116, to another device, such as memory 120, without requiring lower processor 110 to perform the data transfer. Multi-core system 100 can be utilized in a base transceiver station (BTS), such as a fourth generation wireless network (4G) BTS, or other type of communications device. However, multi-core system 100 can be generally utilized to provide multi-core processing in electronic devices other than communications devices.

As shown in FIG. 1, upper sub-system 102 is coupled to lower sub-system 106 via data path 132, which provides a hardware conduit for communication between upper processor 104 and lower processor 110. Upper processor 104 can be, for example, a RISC processor, such as an ARM processor, and includes operating system 124 and operating system programs 126. Upper processor 104 can also include internal memory, such as synchronous dynamic RAM (SDRAM). Operating system 124 can be an embedded operating system, such as, for example, an embedded Linux operating system, and operating system programs 126 can include programs to be executed on operating system 124. However, operating systems other than a Linux operating system can be utilized in upper processor 104 as required by a user. In one embodiment, upper processor 104 can be configured to perform MAC layer functions including high level control protocol processing, such as IP processing, and encryption. For example, upper processor 104 can be configured to receive IP packets from lower processor 110 via data path 132, convert the IP packets into MAC packets, and provide the MAC packets to lower processor 110. Upper processor 104 can request lower processor 110 to perform, for example, an encryption operation on crypto engine 118.

Lower processor 110 can also be, for example, a RISC processor, such as an ARM processor, and includes system dispatcher 128 and hardware drivers block 130. Lower processor 110 can also include internal memory, such as SDRAM. Lower processor 110 can be configured to run system dispatcher 128, which can comprise a customized program that can be configured to control transactions for execution on hardware resources, such slave processing cores 116 and crypto engine 118. A transaction can represent a processing operation or step to be performed on a hardware resource in multi-core system 100 and can be described by a Transaction Control Block (TCB). For example, the TCB can specify input data, where to place output data, and all information required to run a transaction, such as function, required hardware resource, and priority. The TCB can also include pointers to other TCBs to allow basic transaction scheduling.

System dispatcher 128 provides centralized data control for multi-core system 100 and can include a control parameters block, which can include a state machine, which can be user-programmable, an event handler, and a transaction router, which are not shown in FIG. 1. System dispatcher 128 can implement a data path via transactions, which can be executed on hardware resources, such as slave processing cores in slave processing cores 116. System dispatcher 128 can be configured to receive events, which can be completed transactions from hardware resources, such as slave processing cores, or can be data received, for example, in an IP packet from Ethernet interface 108. Each event can have a standard format, such as a TCB format. System dispatcher 128 can also be configured to decode an event (e.g. completed transaction) and to determine whether a new transaction(s) is required to be generated in response to the event. Each completed transaction can include, for example, data and control information, which can indicate the next processing step to be performed in a sequence of processing steps.

For example, if the next processing step to be performed is indicated in the control information in the completed transaction, system dispatcher 128 can be configured to generate a transaction that corresponds to the next processing step. If, for example, the next processing step is not indicated in the control information of the completed transaction, the event handler can be configured to utilize the state machine in the control parameters block (not shown in FIG. 1) to determine the next processing step. New transactions that are generated by system dispatcher 128 can be routed to the appropriate hardware resource for execution via an associated hardware driver.

Hardware drivers block 130 includes hardware drivers (also referred to as "hardware abstraction layer (HAL) drivers") for respective hardware resources, such as slave processing cores 116, crypto engine 118, upper processor 102, and lower processor 110. Hardware drivers block 130 enable system dispatcher 128 to interface with the respective hardware resources without requiring system dispatcher 128 to know the specific details of hardware resource operation. Each hardware resource, such as a slave processing core, can be handled by lower processor 110 via a hardware driver in hardware drivers block 130. Each hardware driver can be configured to handle a transaction launch and completion and to convert from a transaction from a standard format to a resource specific format. For example, a hardware driver in hardware drivers block 130 can be configured to receive a transaction in a standard format (e.g. a TCB format), from system dispatcher 128, to convert the transaction to a native format required by a hardware resource, such as a DSP or coprocessor, for execution, to provide the transaction to the hardware resource for execution, and to return the completed transaction to system dispatcher 128 as an event in the standard format (e.g. the TCB format). In one embodiment, a hardware driver can accept multiple transactions from system dispatcher 128 simultaneously.

Also shown in FIG. 1, Ethernet interface 108 is coupled to lower processor 110 via data path 134 and can be used to receive and transmit data encoded in, for example, IP (Internet Protocol) packets. Ethernet interface 108 can be coupled to a network (not shown in FIG. 1), such as a wireless provider network, for receiving input data from the network and providing output data to the network. Ethernet interface 108 can be coupled to a 4G wireless provider network, for example. In one embodiment, packets can be exchanged over Ethernet interface 108, wherein lower processor 110 can be configured to send packets over Ethernet interface 108 as standard Ethernet/IP packets. However, the format sent to and from a hardware driver associated with Ethernet interface 108 can be an Ethernet/IP packet encapsulated in a TCB.

In one embodiment, lower processor 110 can be configured to send TCBs to other multi-core systems for execution, and the other multi-core systems would be configured to return the results back to multi-core system 100. The decision to send TCBs to other multi-core systems can be made, for example, at the hardware driver level. In this case, the TCB can be packaged up and can include all input, output, and context data, rather than just having pointers to the input, output, and context data. The TCB can be sent over, for example, Ethernet interface 108 or other type of interface.

In one embodiment, Ethernet I/O transactions can be handled by a DMA engine, which can allow, for example, queuing of multiple transactions. In one embodiment, an output DMA engine can construct IP packets on the fly (i.e. dynamically). For example, a scatter/gather scheme can be used to build IP packets and avoid data copies and a hardware driver can be signaled later to free data if required. In one embodiment, an input DMA engine can fill pre-assigned buffers and a hardware driver can be signaled when a buffer has been filled.

Further shown in FIG. 1, lower processor 110 is coupled to hardware scheduler 112 via data path 136 and hardware scheduler 112 is coupled to slave processing cores 116 via data path 138. Hardware scheduler 112 provides an interface between lower processor 110 and slave processing cores 116. Thus, since lower processor 110 is interfacing to hardware scheduler 112, lower processor 110 does not have to know the location or operation of slave processing cores in slave processing cores 116. Thus, if a transaction needs to be executed, system dispatcher 128 in lower processor 110 can be configured to send the transaction to the appropriate hardware driver in hardware drivers block 130, which can send the transaction to, for example, a DSP in slave processing cores 116 for execution via hardware scheduler 112. In one embodiment, hardware scheduler 112 can include a separate hardware scheduler for coprocessors and a separate hardware scheduler for DSPs in slave processing cores 116.

Slave processing cores 116 can include multiple slave processing cores, such as slave processing cores 140, 142, and 144, for executing transactions, such as transaction 146 in slave processing device 140. It is noted that although only three slave processing cores are discussed herein to preserve brevity, slave processing cores 116 can include more than three slave processing cores. In one embodiment, slave processing cores 116 can include a plurality of slave processing device, where the slave processing cores can be configured in clusters of four slave processing cores. Slave processing cores 140, 142, and 144 can each be, for example, a DSP or a coprocessor, such as a FEC (forward error correcting) coprocessor. A slave processing device, such as a DSP, can perform transactions relating to, for example, modulation and channel estimation.

In one embodiment, a slave processing core, such as a DSP or a coprocessor, can be held in a reset state (i.e. in a low power state) when idle. If the slave processing core is idle when a transaction arrives, the transaction can be immediately launched and can run until it has been completed. After the transaction had been completed by the slave processing core, a hardware driver associated with the slave processing core can be triggered. If there are no slave processing cores available to execute a transaction that is ready to be executed, the transaction can be queued in one of multiple queues, where each queue can have a different priority level. When a slave processing core becomes available, the transaction having the highest priority can be executed by the available slave processing core. If there are no transactions waiting to be executed, the slave processing core can return to the reset state.

Also shown in FIG. 1, lower processor 110 is coupled to hardware scheduler 114 via data path 148 and hardware scheduler 114 is coupled to crypto engine 118 via data path 150. Hardware scheduler 114 provides an interface between lower processor 110 and crypto engine 118. Thus, since lower processor 110 is interfacing to hardware scheduler 114, lower processor 110 does not have to know the location or operation of crypto engine 118. Thus, if a transaction needs to be executed by crypto engine 118, system dispatcher 128 in lower processor 110 can be configured to send the transaction to the appropriate hardware driver in hardware drivers block 130, which can send the transaction to crypto engine 118 via hardware scheduler 114. After the transaction has been executed by crypto engine 118, the completed transaction can be sent back to system dispatcher 128 via the hardware driver associated with crypto engine 118. Crypto engine 118 can execute transactions related to, for example, data encryption.

Further shown in FIG. 1, slave processing cores 116 is coupled to memory 120 via data path 152 and memory 120 is coupled to radio interface 122 via data path 154. Memory 120 can comprise random access memory (RAM), such as, for example, SDRAM, and can provide a data storage location for slave processing cores in slave processing cores 116 and radio interface 122. For example, slave processing cores 140, 142, and 144 in slave processing cores 116 and radio interface 122 can each transfer data into memory 120 and transfer data out of memory 120. For example, output data from one or more slave processing cores in slave processing cores 116 can be initially outputted into memory 120 and then transferred from memory 120 to radio interface 122. In one embodiment, data can be outputted from one or more slave processing cores in slave processing cores 116 directly to radio interface 122 without being transferred into and out of memory 120 via a data path (not shown in FIG. 1) between slave processing cores 116 and radio interface 122.

Radio interface 122 provides an I/O interface for radio data, such as IQ samples. Radio interface 122 can provide input and output of high bandwidth data, for example. Radio I/O data can be handled, for example, by DMA (e.g. one or more DMA engines). In one embodiment, data can be transferred to/from tightly coupled DSP memory. The data in the DSP memory can be organized to facilitate DSP processing, for example. In one embodiment, a DMA engine can be configured to convert to and from a radio interface format. In one embodiment, an output DMA can be configured to construct a radio interface data stream on the fly and to read in symbols from different DSP memories. An input DMA can be configured to decode the radio interface data stream and to send individual symbol data to different DSP memories.

In one embodiment, multi-core system 100 can provide debuggability based on trace generation and internal logs. A trance generation scheme can follow, for example, a Unified Diagnostics model. Internal logs can be available for run time queries or core dumps, for example. In one embodiment, a state machine can be configured to log all transaction flows, which allows data path reconstruction. In one embodiment, individual transactions can also generate diagnostic data and a diagnostic buffer can be available for data corresponding to each transaction. When enabled, diagnostic data can be queued for trace generation. In one embodiment, upper processor 104 can generate diagnostic packets.

Figure 2:
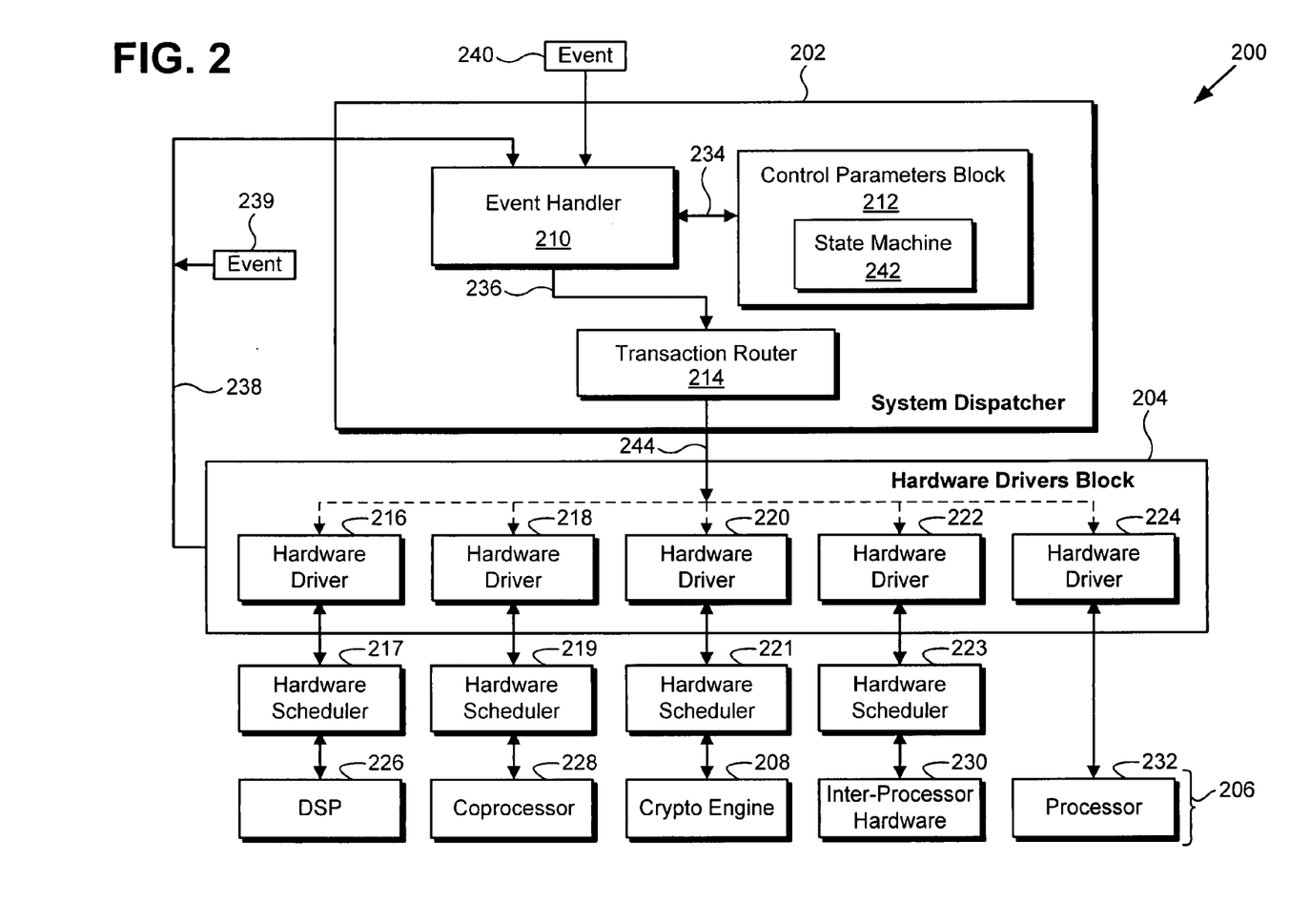
FIG. 2 shows a diagram of an exemplary system dispatcher, exemplary hardware drivers block, and exemplary hardware resources, according to one embodiment of the present invention.

FIG. 2 shows a diagram of system dispatcher 228, hardware drivers block 204, and hardware resources 206, according to one embodiment of the present invention. In FIG. 2, system dispatcher 202, hardware drivers block 204, and crypto engine 208 correspond, respectively, to system dispatcher 128, hardware drivers block 130, and crypto engine 118 in multi-core system 100 in FIG. 1. In FIG. 2, system dispatcher 202 includes event handler 210, control parameters block 212, and transaction router 214, hardware drivers block 204 includes hardware drivers 216, 218, 220, 222, and 224 (hereinafter "hardware drivers 216 through 224"), and hardware resources 206 include slave processing cores, such as DSP 226 and coprocessor 228, and crypto engine 208, inter-processor hardware 230, and processor 232.

As shown in FIG. 2, event handler 210 is coupled to parameters block 212 via data path 234 and coupled to transaction router 214 via data path 236. Event handler 210 can be configured to receive events, such as event 239, in a TCB format from hardware drivers block 204 via data path 238, where each event corresponds to transaction that has been completed by one of hardware resources 206, such as DSP 226 or coprocessor 228. Event handler 210 can also be configured to receive an event, such as event 240, in TCB format, where the event which does not correspond to a completed transaction by a hardware resource in the multi-core system. For example, event 240 can comprise data that is encoded in an IP packet and received from Ethernet interface 108. Event handler 210 can be configured to decode the events it receives and to determine whether new transactions need to be generated in response to the events. To determine whether a new transaction needs to be generated in response to an event, event handler 210 can be configured to access configuration information and data in control parameters block 212, which includes state machine 242. For example, event handler 210 can be configured to communicate with state machine 242 to determine whether a new transaction needs to be generated.

State machine 242 can use a standard format (e.g. a TCB format), and can include, for example, a sequence of processing steps to be performed, which can be programmed by a user. In one embodiment, state machine 242 can include nested switch statements and can be configured to call custom functions to calculate next processing steps. When event handler 210 accesses state machine 242 to determine what to do next, state machine 242 can indicate the next processing step to be performed. Event handler 210 can then generate no transactions or one or more transactions, depending on whether the next processing step is ready, and what it is. The transaction that is created by event handler 210 can be described in a TCB, which can specify input data, where to place output data, and all information required to know how to run or execute the transaction (e.g. function of the transaction, required hardware resource, and priority). The TCB can also include pointers to other TCBs to allow basic transaction scheduling, for example. The TCB can include, for example, both the description of the transaction as well as the results of the transaction (i.e. the completed transaction data can be stored in the TCB).

If the next processing step is not indicated by state machine 242, event handler 210 can be configured to calculate the next processing step. For example, event handler 210 can calculate the next processing step to be performed by accessing and using configuration information and data in control parameters block 212. In one embodiment, event handler 210 can calculate a sequence of processing steps to be performed. Event handler 210 can also be configured to make logic decisions and allocate hardware resources.

In one embodiment, state machine 242 can include a first part for checking for a pre-specified next processing step and a second part for determining a next processing step. When the next processing step is specified, the next transaction can be directly created by event handler 210. In the second part of state machine 242, transaction data can be examined to classify a completed transaction. In one embodiment, state machine 242 can include a first switch statement based on resource type to determine a format for returned transaction data and a second switch statement based on state information to indicate what transaction was just completed and to allow event handler 210 to calculate the next required processing step(s).

After a transaction has been created by event handler 210, transaction router 214 can be configure to receive the transaction via data path 236 and to route the transaction to an appropriate hardware driver in hardware drivers block 204 for execution by a hardware resource that is associated with that driver. For example, to provide a transaction to DSP 226 for execution, transaction router 214 can receive the transaction from event handler 210 and route the transaction via data path 244 to hardware driver 216, which can provide the transaction to DSP 226 via hardware scheduler 217.

Also shown in FIG. 2, system dispatcher 202 is coupled to hardware drivers block 204 via data path 244, hardware drivers 216, 218, 220, and 222 are coupled to DSP 226, coprocessor 228, crypto engine 208 and inter-processor hardware 230 via respective hardware schedulers 217, 219, 221, and 223, and hardware driver 224 is coupled to processor 232. DSP 226 and coprocessor 228 correspond to slave processing cores in slave processing cores 116 in FIG. 1, crypto engine 208 corresponds to crypto engine 118 in FIG. 1, and processor 232 can correspond to lower processor 110 in FIG. 1. Also, hardware schedulers 217 and 219 can be included in hardware scheduler 112 in FIG. 1 and hardware scheduler 221 corresponds to hardware scheduler 114 in FIG. 1.

Hardware drivers 216 through 224 can each be configured to receive a transaction(s) in TCB format from transaction router 214, convert the transaction(s) to a format required by an associated hardware resource, and provide the transaction to the hardware resource for execution. For example, hardware driver 216 can be configured to receive a transaction in TCB format from transaction router 214 via data path 244, convert the transaction into a native format of DSP 226, and direct the transaction through hardware scheduler 217 to DSP 226 for execution. The TCB that is associated with a transaction can include, for example, pointers to input, output, and context areas of memory, where the format of the data pointed to is dependent on the specific hardware resource. After a transaction has been executed by a hardware resource, such as DSP 226 or coprocessor 228, the hardware driver associated with the hardware resource can provide the results of the completed transaction in the TCB corresponding to the transaction and provide the completed transaction in TCB format to event handler 210 of system dispatcher 202 as an event via data path 238. Thus, input and context data can be provided to start (i.e. launch) a transaction and output data and context can be collected at the completion of the transaction. Thus, after the transaction has been completed by a hardware resource and packaged by an associated hardware drive, the completed transaction becomes an event that can be transferred from the hardware driver to event handler 210.

In one embodiment, when a transaction for a DSP, such as DSP 226, is launched by a hardware driver, such as hardware driver 216, the hardware driver can program a DMA engine or controller, such as a signal processing unit (SPU) memory controller (SMC) DMA, to load program code to code memory (e.g. a portion of memory 120 designated for storing code), and load context and input data to data memory (i.e. a portion of memory 120 designated for storing data). The DSP can then be started and the transaction can be executed by the DSP. When the transaction has been completed, the DMA engine or controller can copy the context data back out of memory and can also copy the output data out of memory.

A transaction can be programmed on either a DSP, such as DSP 226, or lower processor 232. However, a coprocessor, such as coprocessor 228, is hard-coded and, therefore, does not need to be programmed. Although transaction code can have a relatively free format, it (i.e. the transaction code) can be required to follow the TCB format for I/O. A transaction generated in system dispatcher 202 can be provided to hardware driver 224 for execution on processor 232, such as lower processor 110 in FIG. 1.

Inter-processor hardware 230, which can be controlled by hardware driver 222 via hardware scheduler 223, can comprise a hardware conduit, such as data path 132 in FIG. 1, to allow communication between upper processor 104 and lower processor 110. For example, upper processor 104 can send a message through inter-processor hardware 230 to lower processor 110 via inter-processor hardware 230. The message, which can include, for example, a request for lower processor 110 to perform a service or operation, can appear at lower processor 110 as an event that can be inputted into event handler 210 of system dispatcher 202 for processing. Lower processor 110 can provide data to upper processor 104 via a hardware driver associated with upper processor 104.

Figure 3:
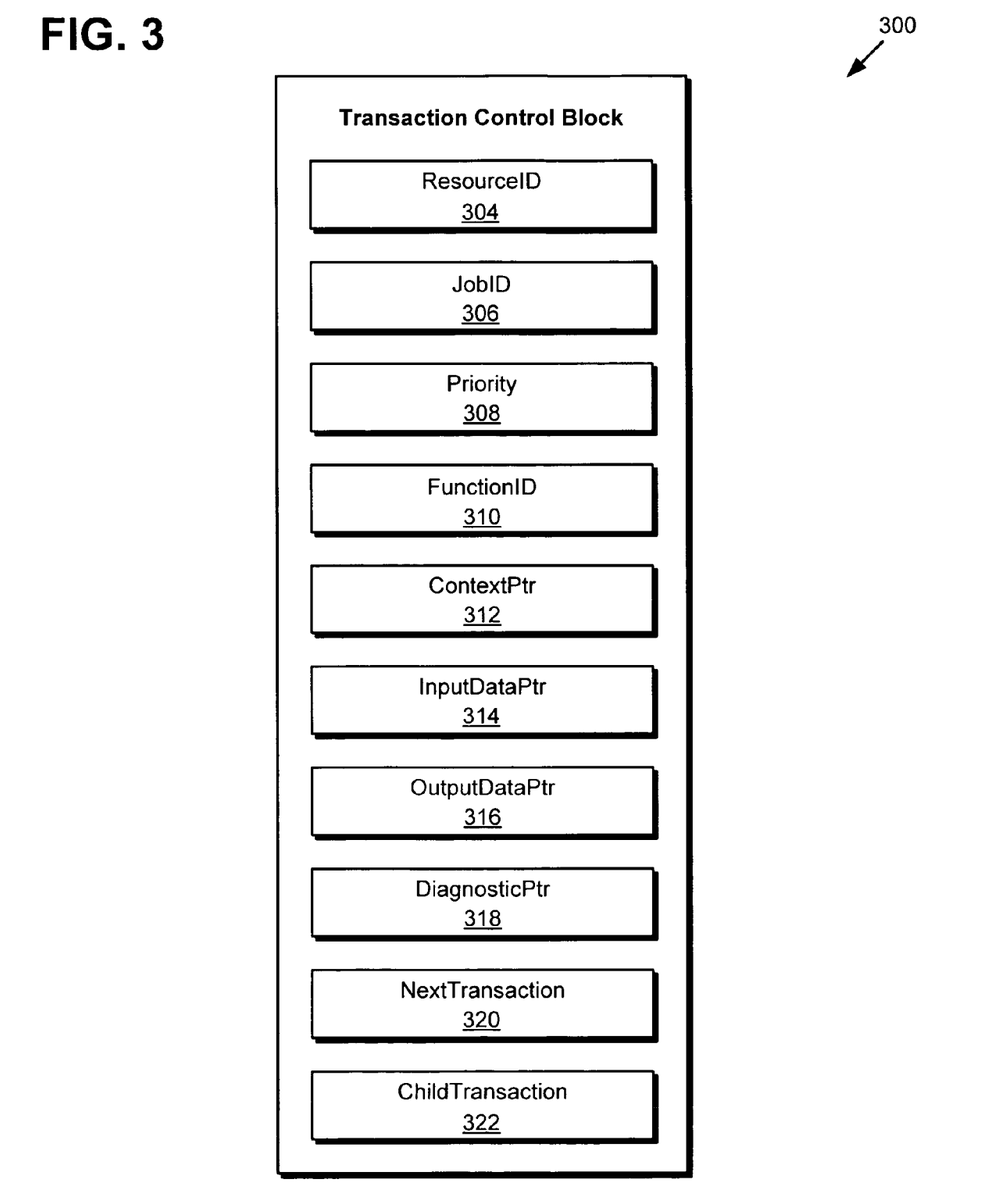
FIG. 3 shows a diagram of an exemplary transaction control block, according to one embodiment of the present invention.

FIG. 3 shows a diagram of transaction control block (TCB) 300, according to one embodiment of the present invention. TCB 300 can comprise a block of memory, such as a block of memory in memory 120, that can be utilized by a system dispatcher, such as system dispatcher 128 in lower processor 110 in FIG. 1, to receive events and dispatch transactions to hardware resources, such as slave processing cores in slave processing cores 116 in multi-core system 100. TCB 300 includes ResourceID field 304, which can indicate the type of hardware resource that a transaction is required to run on. However, when there are multiple instances of a given hardware resource, such as multiple DSPs in slave processing cores 116 in FIG. 1, TCB 300 does not indicate which particular instance (e.g. which DSP) to use for executing a transaction. The hardware drive (i.e. HAL driver) that accepts the TCB can efficiently allocate transactions to specific instances of a hardware resource, such as specific slave processing cores in slave processing cores 116 in FIG. 1.

TCB 300 further includes JobID field 306, which can be used by the system dispatcher (e.g. system dispatcher 128 in FIG. 1) to correlate transaction launches and completions. JobID field 306 is not used by the HAL driver when running a transaction, so it (i.e. JobID field 306) can be set to any value the system dispatcher chooses. TCB 300 further includes Priority field 308, which can indicate the priority of a launched transaction. In an embodiment in which a HAL driver supports priority handling, it can internally include multiple queues of transactions, where each queue represents a priority level. When launching the next transaction, for example, the HAL driver will take the next transaction from the highest priority non-empty queue. TCB 300 further includes FunctionID field 310, which can indicate a particular task that the transaction is to perform. FunctionID field 310 can include a unique list of values for each value of ResourceID field 304. A HAL driver can take a FunctionID field 310 value and use it to launch the correct operation at the hardware resource level, for example.

TCB 300 further includes ContextPtr field 312, which can point to context data for the transaction (i.e. information that needs to be saved between consecutive transaction executions). The format for the context data can depend on the particular transaction to be run. TCB 300 further includes InputDataPtr field 314, which can point to input data for the transaction. The format for the input data can also depend on the particular transaction to be run. TCB 300 further includes OutputDataPtr field 316, which can point to output data for the transaction. The format for the output data can also depend on the particular transaction to be run. TCB 300 further includes DiagnosticPtr field 318, which can point to a block of memory that can be used for diagnostic data. However, each transaction can choose a particular use for the block of memory pointed to by DiagnosticPtr field 318. In one embodiment, depending on system diagnostic settings, some or all of this memory block may be logged for diagnostic purposes.

TCB 300 further includes NextTransaction field 320, which can point to another TCB. For example, NextTransaction field 320 can be used when sending TCBs to the system dispatcher to avoid multiple calls when multiple transactions need to be queued. For example, NextTransaction field 320 can be used by hardware (HAL) drivers to implement linked lists of transactions to be dispatched. TCB 300 further includes ChildTransaction field 322, which can point to a TCB that should be dispatched when the transaction described in the current TCB has been completed. For example, if ChildTransaction field 322 does point to the next TCB to be dispatched, the event handler in the system dispatcher can pass the transaction indicated in the next TCB directly to the system dispatcher's transaction router without having to calculate or determine the next transaction to be executed.

Figure 4:
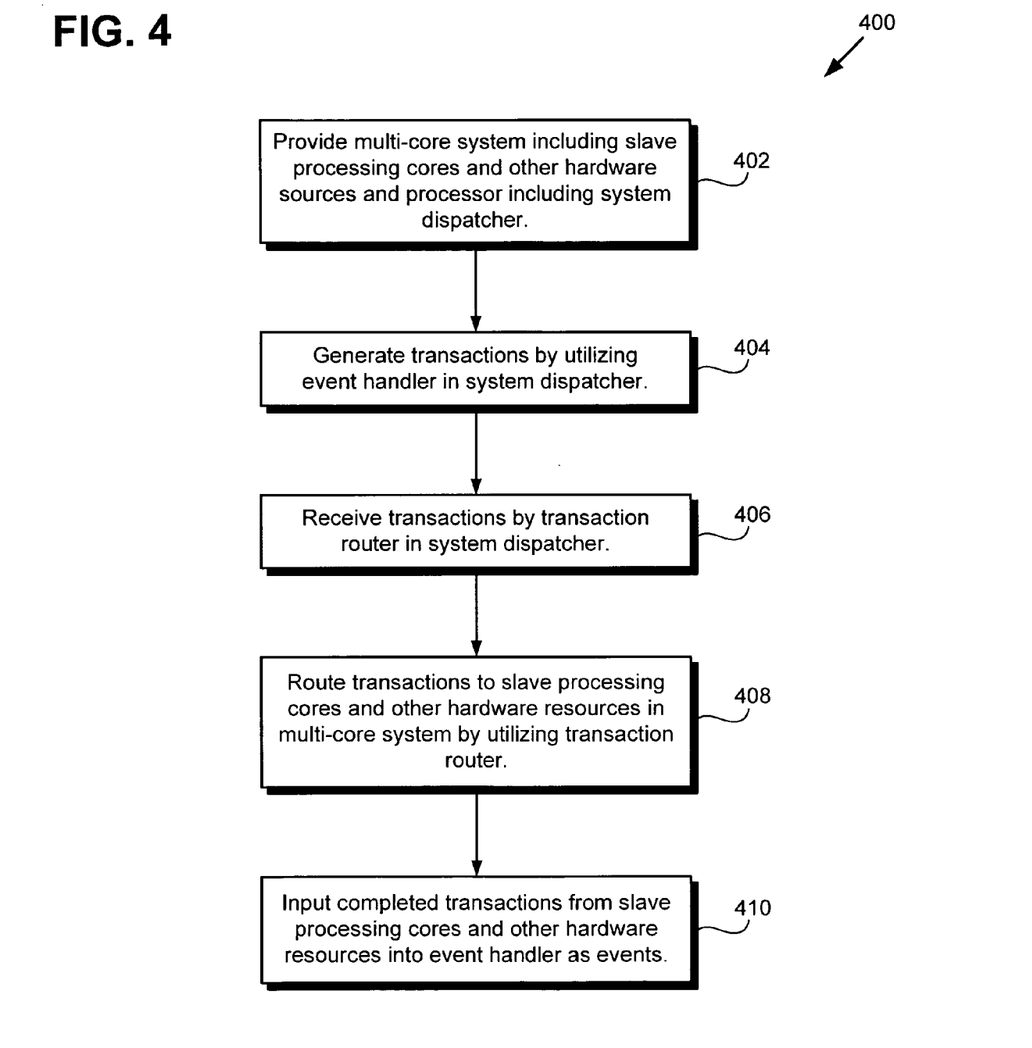
FIG. 4 is a flowchart presenting a method of providing a central transaction control in a multi-core system including slave processing cores and a system dispatcher in a processor, according to one embodiment of the present invention.

FIG. 4 shows flowchart 400 illustrating a method for providing centralized transaction control in a multi-core system including slave processing cores and other hardware resources and a system dispatcher in a processor, according to one embodiment of the present invention. Certain details and features have been left out of flowchart 400 of FIG. 4 that are apparent to a person of ordinary skill in the art. For example, a step may consist of one or more sub-steps or may involve specialized equipment, as known in the art. While steps 402 through 410 shown in flowchart 400 are sufficient to describe one embodiment of the present invention, other embodiments of the invention may utilize steps different from those shown in flowchart 400.

Beginning at step 402, a multi-core system including slave processing cores and other hardware resources and a processor (e.g. lower processor 110) including a system dispatcher is provided. For example, multi-core system 100 in FIG. 1 including slave processing cores 116 and other hardware resources, such as crypto engine 118, and lower processor 110 including system dispatcher 128 can be provided. At step 404, transactions are generated by utilizing an event handler in the system dispatcher. For example, event handler 210 in system dispatcher 202 in FIG. 2 can be configured to generate transactions. Event handler 210 can also be configured to determine if a next transaction is necessary by utilizing state machine 242 in control parameters block 212.

At step 406, the transactions generated by the event handler are received by a transaction router in the system dispatcher. For example, transaction router 214 in system dispatcher 202 can be configured to receive transactions generated by event handler 210 via data path 236. At step 408, transactions are routed to slave processing cores and other hardware resources in the multi-core system by utilizing the transaction router. For example, transaction router 214 in FIG. 2 can be configured to route transactions from event handler 210 to slave processing cores, such as DSP 226 and coprocessor 228, and crypto engine 208, inter-processor hardware 230, and processor 232 via respective hardware drivers 216, 218, 220, 222, and 224 in hardware drivers block 204 in FIG. 2.

At step 410, completed transactions from slave processing cores and other hardware resources are inputted into the event handler in the system dispatcher as events. For example, a completed transaction completed by a slave processing core, such as DSP 226, can be received by hardware driver 216 via hardware scheduler 217 and inputted into event handler 210 as an event, such as event 239, via data path 238. Also, an event, such as event 240, can be inputted into event handler 210, where the event has been received as encoded data in a TCB format in an Ethernet packet over Ethernet interface 108. However, an event, such as event 240, can also arrive over other interfaces as well.

From the above description of the embodiments of the present invention, it is manifest that various techniques can be used for implementing the concepts of the present invention without departing from its scope. Moreover, while the present invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A multi-core system comprising:
a lower sub-system including a first processor and a plurality of slave processing cores, said first processor configured to control processing on said plurality of slave processing cores; and
said first processor including a system dispatcher configured to control transactions having Transaction Control Blocks (TCBs) for execution on said plurality of slave processing cores;
said first processor further including a plurality of hardware drivers for receiving said transactions being in a TCB format from said system dispatcher, converting said transactions from said TCB format into a native format required by each of said plurality of slave processing cores, wherein at least one of said plurality of slave processing cores has a different native format than another one of said plurality of slave processing cores;
wherein after execution of a first transaction of said transactions by a first slave processing core of said slave processing cores associated with a first hardware driver of said plurality of hardware drivers, said first hardware driver providing results of said execution to said system dispatcher in said TCB format for further execution by one of said slave processing cores;
wherein said TCB format includes a resource identification field, a job identification field, a priority field, a function identification field, a context pointer field, an input data pointer field, an output data pointer field and a next transaction field.

2. The multi-core system of claim 1 further comprising an upper sub-system in communication with said lower sub-system and including a second processor configured to provide protocol processing.

3. The multi-core system of claim 1, wherein said system dispatcher is further configured to generate said transactions for execution on said plurality of slave processing cores.

4. The multi-core system of claim 1, wherein said lower sub-system further includes a hardware scheduler for coupling said system dispatcher to said plurality of slave processing cores.

5. The multi-core system of claim 3, wherein said system dispatcher includes an event handler in communication with a state machine, and wherein said event handler is configured to generate said transactions, and wherein said event handler is configured to utilize said state machine to determine a next transaction to generate.

6. The multi-core system of claim 1, wherein before execution of the first transaction of said transactions, the plurality of slave processing cores are held in a reset state, wherein the plurality of slave processing cores return to the reset state after execution of a final transaction of said transactions.

7. The multi-core system of claim 1, wherein said TCB format further includes a diagnostic pointer field and a child transaction field.

8. The multi-core system of claim 1, wherein said TCB format includes a diagnostic pointer, and wherein the multi-core system is configured to:
generate diagnostic data for each of the plurality of transactions; and
store the diagnostic data in a memory address indicated by said diagnostic pointer.

9. A method for providing a centralized transaction control in a multi-core system for a plurality of hardware resources including a plurality of slave processing cores, and a system dispatcher in a processor, said method comprising:
generating a plurality of transactions having Transaction Control Blocks (TCBs) by utilizing an event handler in said system dispatcher;
receiving said plurality of transactions in a TCB format by a transaction router in said system dispatcher;
routing said transactions to said plurality of slave processing cores by utilizing said transaction router, said transactions being converted from said TCB format into a native format by a plurality of hardware drivers for execution on said plurality of slave processing cores, wherein at least one of said plurality of slave processing cores has a different native format than another one of said plurality of slave processing cores;

executing a first transaction of said transactions by a first slave processing core of said slave processing cores associated with a first hardware driver of said plurality of hardware drivers; and providing results of said execution by said first hardware driver to said system dispatcher in said TCB format for further execution by one of said slave processing cores;

wherein said TCB format includes a resource identification field, a job identification field, a priority field, a function identification field, a context pointer field, an input data pointer field and an output data pointer field.

10. The method of claim 9 further comprising inputting a completed transaction from one of said plurality of slave processing cores into said event handler as an event.

11. The method of claim 9 further comprising determining a next transaction to be generated by said event handler by utilizing a state machine in said system dispatcher.

12. The method of claim 11, wherein said state machine includes a user-programmable sequence of processing steps to be performed.

13. The method of claim 9 further comprising receiving an event in said TCB format from an Ethernet interface in said multi-core system by said event handler.

14. The method of claim 9, wherein said TCB format further includes a diagnostic pointer field, a next transaction field and a child transaction field.

15. The method of claim 9, wherein said TCB format includes a next transaction field having a pointer to another TCB for scheduling a next transaction.

16. The method of claim 9, wherein said TCB format includes a diagnostic pointer, and wherein the method further comprises:

generating diagnostic data for each of the plurality of transactions; and storing the diagnostic data in a memory address indicated by said diagnostic pointer.

* * * * *